United States Patent [19]

Ellis

[11] Patent Number: 5,588,459

[45] Date of Patent: Dec. 31, 1996

[54] DEVICE FOR FACILITATING REMOVAL OF WASTEWATER AND SEWAGE FROM A RECREATIONAL VEHICLE

[76] Inventor: Mark E. Ellis, P.O. Box 214, Kaw City, Okla. 74641

[21] Appl. No.: 558,715

[22] Filed: Nov. 16, 1995

[51] Int. Cl.⁶ .............................. B08B 3/04; B08B 9/06; F16L 45/00
[52] U.S. Cl. .................... 137/239; 134/166 C; 134/186; 137/240; 137/810; 137/812; 137/893; 137/899
[58] Field of Search ............................... 4/321, 323, 434, 4/661; 134/166 C, 167 C, 186; 137/239, 240, 355.16, 899, 810, 812, 888, 891, 893

[56] References Cited

U.S. PATENT DOCUMENTS

| | | |
|---|---|---|
| 3,712,331 | 1/1973 | Otto ............................... 137/355.16 |
| 3,811,462 | 5/1974 | Feliz ........................................ 137/899 |
| 3,897,599 | 8/1975 | Artzer ......................................... 4/323 |
| 4,133,347 | 1/1979 | Mercer ..................................... 137/899 |
| 4,527,295 | 7/1985 | Lacore ......................................... 4/323 |
| 4,550,453 | 11/1985 | Norman ....................................... 4/323 |
| 4,667,351 | 5/1987 | Williams ...................................... 4/323 |
| 4,844,121 | 7/1989 | Duke .................................... 137/355.16 |
| 5,141,017 | 8/1992 | Trottier ..................................... 137/240 |
| 5,206,962 | 5/1993 | Thorwaldson ............................. 4/323 |

Primary Examiner—George L. Walton
Attorney, Agent, or Firm—Richard W. Collins

[57] ABSTRACT

A sewage removal device for use with a recreational vehicle. The device is comprised of a housing attachable to the sewage drain conduit of the recreational vehicle. Sewage from the recreational vehicle drains into a cavity in the housing, and a water inlet directs a stream of water through a nozzle into an outlet conduit in the housing. The water stream facilitates removal of sewage as the sewage drains from the recreational vehicle into the cavity of the housing.

8 Claims, 3 Drawing Sheets

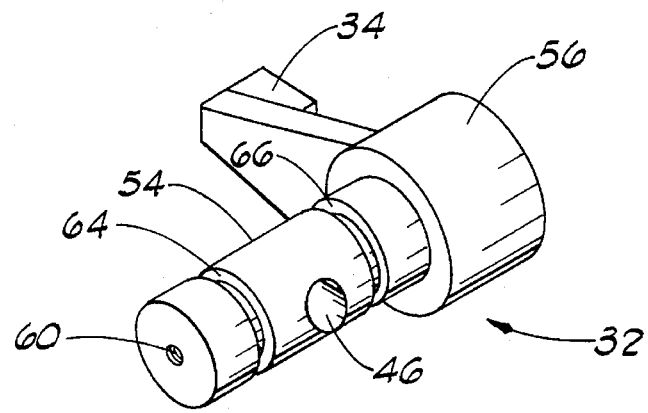
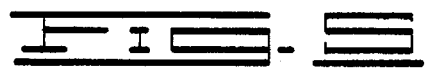
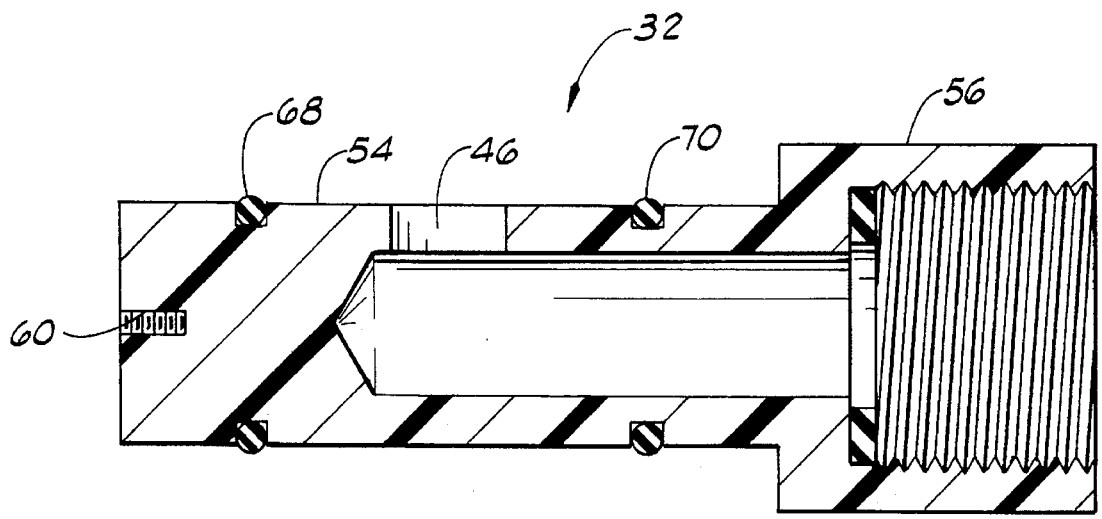
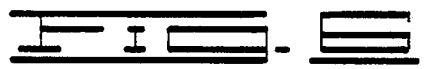

5,588,459

1

DEVICE FOR FACILITATING REMOVAL OF WASTEWATER AND SEWAGE FROM A RECREATIONAL VEHICLE

BACKGROUND OF THE INVENTION

1. Field of the Invention

The present invention relates to a device for facilitating drainage of wastewater from the holding tank or tanks of a recreational vehicle, and more particularly to a device that attaches to the wastewater outlet of a recreational vehicle and includes provision for a jet stream of water to be directed into an outlet conduit on the device to facilitate removal of wastewater from the device. The jet stream of water serves two purposes. It expedites wastewater removal from the tank being drained, and it pulverizes any solid material in the wastewater, thus reducing or eliminating plugging during the wastewater draining procedure.

The term "recreational vehicle," commonly abbreviated as "RV" is an all-encompassing term used to describe the variety of motor homes, travel trailers, and campers presently in use. In these recreational vehicles, users generally attempt to take many of the comforts of home with them to anywhere the open road leads. One of these comforts is indoor plumbing, which can (and typically does) include a sink, a bathtub or shower, and a toilet.

Most larger recreational vehicles have the entire spectrum of plumbed facilities, often including two sinks, a toilet, and a combination bath/shower. The design of the plumbing system of a recreational vehicle is much more complex than the plumbing in a typical home, since the recreational vehicle must include holding tanks both to store fresh water and to store wastewater.

Wastewater is of two different types: gray-water which is wastewater from the sinks and showers or baths, and black-water, which is waste from the toilet. In most recreational vehicles, gray-water and black-water are stored in two different holding tanks. These gray-water and black-water holding tanks must of course be drained periodically, and most recreational vehicle areas include dump stations into which the gray-water and black-water holding tanks may be drained.

2. Background Art

Attempts have been made to facilitate the process of waste removal from an RV.

U.S. Pat. No. 3,811,462 to Feliz describes an elaborate system for this purpose, but it is too complicated to gain widespread acceptance.

U.S. Pat Nos. 4,133,347 to Mercer and 5,141,017 to Trottier both disclose simpler adapters for this purpose, but while they include provisions for backflushing and rinsing the system, they do not provide any means for actually expediting the waste removal process. The Trottier patent contains a particularly thorough description of RV plumbing systems, including the procedure for draining wastewater from conventional systems.

SUMMARY OF THE INVENTION

According to the present invention, a device for expediting removal of sewage and wastewater from a RV is provided. The device not only speeds up the process, but greatly reduces the unpleasantness associated with conventional RV sewage removal.

2

The device of this invention actually pumps the wastewater and sewage from the RV, rather than relying only on gravity drainage as is the case in conventional waste removal processes.

The jet of water from a nozzle supplied by a garden hose or the like is directed through a cavity in the device into the center of an outlet conduit to which a discharge hose is attached. This discharge hose in turn is directed to a receiver at the dump site. The jet easily pulverizes semisolid waste and paper from the RV, greatly reducing or eliminating blockage problems which frequently occur during normal gravity drainage processes. The device of this invention can actually pump the waste to an elevation above the level of the device, a feature that is impossible with normal gravity drain systems.

The device of the invention only requires a source of water under normal household pressure for operation. Most dump stations include a garden hose for supplying non-potable cleanup water. Water from the hose serves to both pump out the wastewater from the RV and to clean and flush the entire waste removal system. At the end of the procedure using the device of the invention, the system is clean and ready for travel without the messy cleanup procedure necessitated by conventional systems.

DESCRIPTION OF THE DRAWINGS

FIG. 5 is a perspective view of a diverter valve for use with the device.

FIG. 6 is a cross-section taken along the longitudinal axis of the valve shown in FIG. 5.

DESCRIPTION OF THE PREFERRED EMBODIMENT

Figure 1:
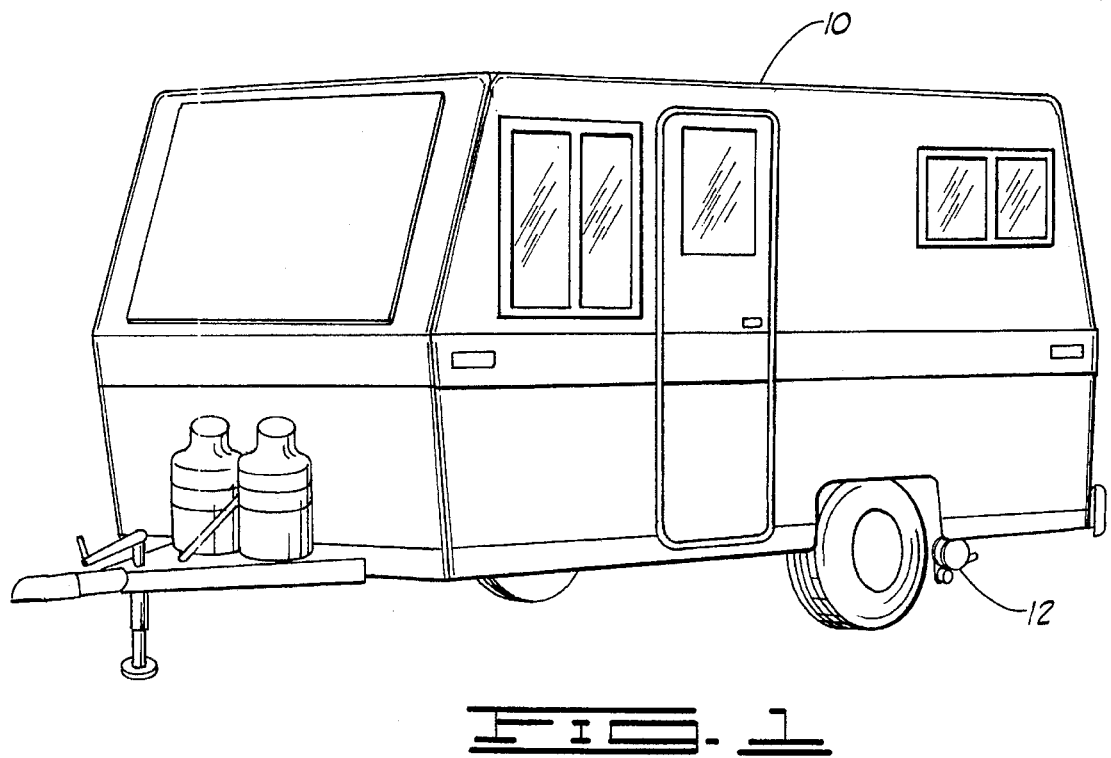
FIG. 1 is a sketch of a typical recreational vehicle with a sewage removal device attached.

A recreational vehicle 10 of the type for which the device of the invention is intended is shown in FIG. 1 with a sewage removal device 12 attached thereto. The sewage removal device 12 is shown in more detail in FIGS. 2 and 3 in which the device can be seen to include a housing 14 having a cover plate 16, which preferably is transparent for reasons to discussed below, attached by screws to the housing 14. The other side of housing 14 has an attachment ring 20 affixed thereto by screws in a pattern matching the screws in cover plate 16. This enables cover plate 16 and attachment ring 20 to be interchanged for reasons to be discussed below.

Attachment ring 20 includes locking fingers 22 adapted to fit over pins 24 on sewage drain conduit 26 (FIGS. 2 and 3) which extends from the RV. Alternatively, the attachment ring 20 and the locking finger and pin arrangement could be deleted and the sewage removal device 12 could be permanently connected to the RV plumbing system. This alternative arrangement is particularly appropriate when the device 12 is to be built-in during original manufacture of the RV. Drain conduit 26 includes a slide valve 28 operable by handle 30 to open and close drain conduit 26 as is conventional. A diverter valve 32 including handle 34 is rotatably mounted in housing 14, and includes means for attachment of a garden hose 36. Preferably, a common quick-disconnect fitting 38 connects hose 36 to valve 32.

Figure 4:
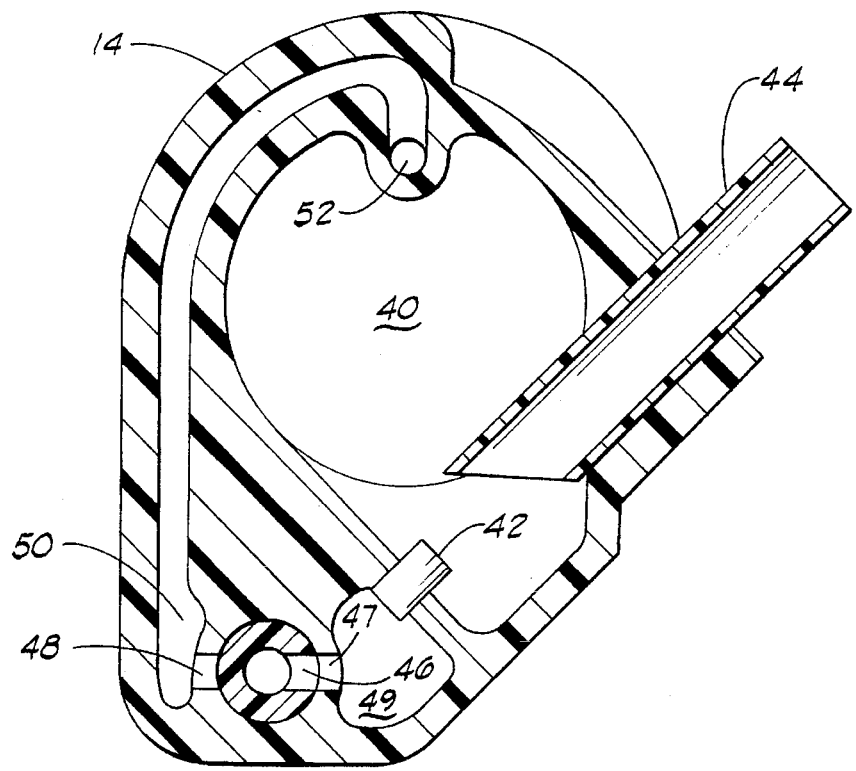
FIG. 4 is a cross-section taken through the center of the device of FIG. 3.

The interior of the device is illustrated in FIG. 4, wherein housing 14 is shown to include a central cavity 40 which extends to a lower area adjacent a jet nozzle 42. Nozzle 42 is aligned with the longitudinal axis of discharge conduit 44 which extends from the lower area of cavity 40 to outside of housing 14.

Diverter valve 32 is shown in FIG. 4 to be positioned for supplying water through diverter valve outlet 46 through opening 47 and lower chamber 49 to nozzle 42 and through discharge conduit 44. Discharge hose 45 attached to conduit 44 extends to a waste receiving pit or tank.

When diverter valve 32 is rotated 180 degrees from the position shown in FIG. 4, diverter valve outlet 46 is aligned with opening 48 in housing 14. Opening 48 extends to channel 50 in housing 14. Channel 50 terminates in an opening 52 aimed through attachment ring 20 toward drain conduit 26 for flushing the system, including the drain conduit, as will be described in the description of the operation.

FIGS. 5 and 6 show details of the diverter valve 32. Diverter valve 32 includes a cylindrical body 54 having an enlarged diameter end 56 which is shown as threaded for attachment of a hose fitting. The other end of valve 32 has a threaded hole 60 for attachment of a washer 62 (FIG. 2) which prevents valve 32 from sliding out of housing 14. Washer 62 is removed when valve 32 is to be removed from housing 14. The body 54 of valve 32 includes two grooves 64 and 66 which contain O-rings 68 and 70 (FIG. 6). To reduce or eliminate leakage into channel 50 when the valve is positioned for flow through nozzle 42, a thin layer of packing (not shown) may be wrapped around valve body 54 between O-rings 68 and 70.

OPERATION OF THE DEVICE

Figure 2:
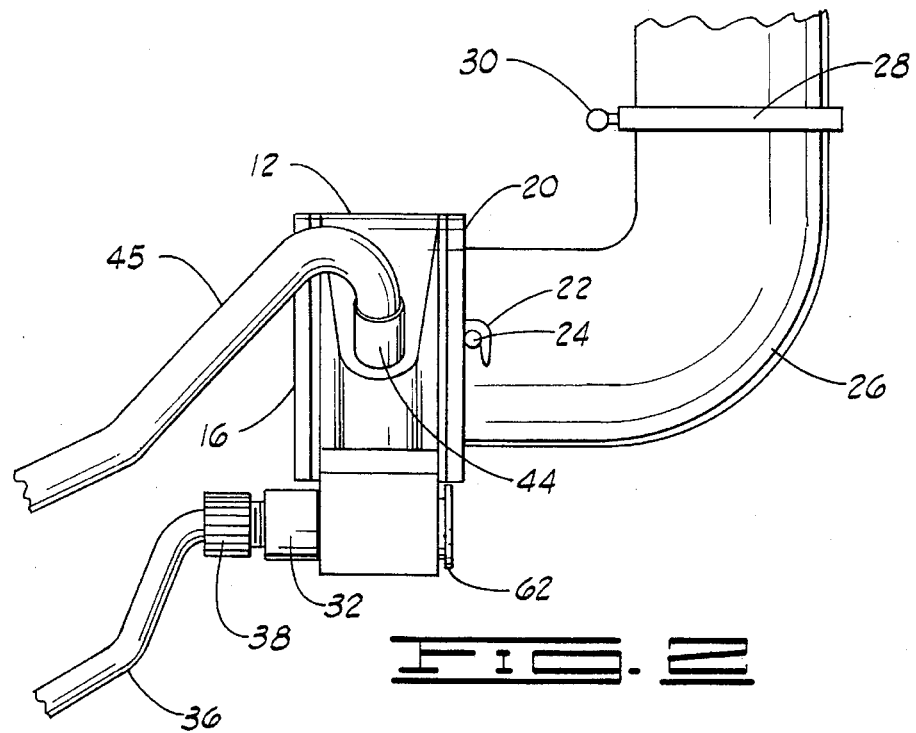
FIG. 2 is a side elevation showing the sewage removal device attached to a drain conduit from the recreational vehicle.
Figure 3:
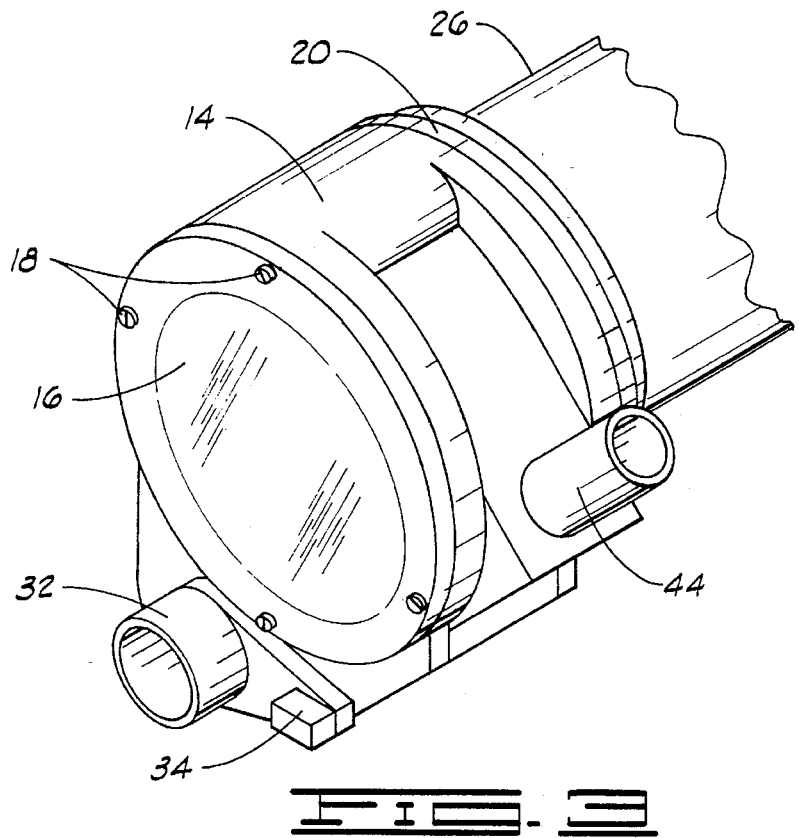
FIG. 3 is a perspective view of the sewage removal device.

In carrying out the sewage removal process, RV 10 is first parked near an RV "dump station." Sewage removal device 12 is attached to RV drain conduit 26 as shown in FIG. 2, and water hose 36 is attached. The outlet end of hose 45 is placed in a waste receptacle, and diverter valve 32 is positioned to deliver water to nozzle 42. Water to hose 36 is turned on, producing a jet of water from nozzle 42 through discharge conduit 44 and discharge hose 45. Slide valve 28 is opened, allowing waste from the RV to drain through drain conduit 26 into cavity 40 of housing 14. The action of the water jet from nozzle 42 pumps the draining waste out of cavity 40 through the discharge conduit and discharge hose to the waste receptacle. The progress of the drainage and removal can be monitored by viewing through transparent cover plate 16. When drainage is complete, diverter valve 32 can be positioned in the flush position to direct water through channel 50 in housing 14 and out opening 52 back up the drain conduit 26. Then, the diverter valve is again positioned to direct water through nozzle 42 to pump out the flush water. The flush operation may be repeated. Preferably, slide valve 28 is then closed, and cleaning water is directed toward the closed slide valve to flush the system upstream of the device 12. The diverter valve is then repositioned to send water through nozzle 42, resulting in a thoroughly cleaned system downstream from slide valve 28. Finally, water to the device is turned off, and the device may be removed and stored. The entire operation is fast, efficient and sanitary, as opposed to conventional waste dump procedures which require extensive cleanup and involve unpleasant handling of drain equipment. In actual practice, conventional dumping procedures present a health hazard due to the difficulty in thoroughly cleaning the conventional equipment and the reluctance of people to spend the necessary time and effort to properly dispose of waste material.

A feature of the invention is that cover plate 16 and attachment ring 20 are interchangeable, so that discharge conduit 44 can be directed toward the rear of RV 10 as shown in FIG. 1, or if the geometry of an RV is such that the discharge conduit needs to be diverted to the front of the RV, cover plate 16 and ring 20 can be interchanged so that the discharge conduit is directed toward the front of the RV. In addition to changing cover plate 16 and attachment ring 20, diverter valve 32 must be removed, by first removing washer 62 and pulling valve 32 from housing 14 and then reinserting valve 32 through the other side of housing 14 and reattaching washer 62 to maintain the valve in housing 14.

Modifications and variations of the device and procedures described will be apparent, and are to be considered within the scope of the invention, which is defined by the appended claims.

I claim:

1. A sewage removal device for use with an RV and the like comprising:
   (a) a housing having an interior cavity and connecting means for attaching said device to a sewage drain conduit on said RV;
   (b) a first opening in said device providing fluid communication between said sewage drain conduit and said interior cavity when said device is attached to said sewage drain conduit;
   (c) a fluid outlet conduit extending from the lower portion of said cavity to the exterior of said housing; and
   (d) a fluid inlet conduit extending from the exterior of said housing and into an interior portion of said housing, said inlet conduit including a nozzle extending from a discharge end thereof and into said cavity in coaxial alignment with said outlet conduit, said nozzle being adapted to discharge a liquid jet stream into the interior of said housing toward said fluid outlet conduit and in alignment with the longitudinal axis of said fluid outlet conduit, whereby fluid discharged from said nozzle and into said outlet conduit creates a pumping action for removing sewage from said cavity and into said outlet conduit which expedites waste removal therefrom.

2. The sewage removal device of claim 1 wherein said housing includes a diverter valve and port means extending from said valve toward said fluid outlet conduit and a flow channel in said housing extending from said valve to a discharge opening directed toward said sewage drain conduit when said device is attached to said RV.

3. The sewage removal device of claim 2 wherein said diverter valve is selectively positionable in a first position for evacuating sewage from said cavity and a second position for flushing said device and said sewage drain conduit.

4. The sewage removal device of claim 1 wherein
   (a) said housing includes a removable cover plate over one side thereof and said detachable connecting means is positioned on the other side of said housing, and said lower plate and connecting means are interchangeable; and
   (b) said fluid outlet conduit extends in a first direction when said cover plate and connecting means are attached in a first position, and extends in a second direction when the positions of said cover plate and connecting means are interchanged.

5. The sewage removal device of claim 4 wherein said cover plate is transparent, whereby progress of sewage removal can be observed.

6. The sewage removal device of claim 1 wherein said fluid inlet conduit includes means for attaching a garden hose thereto.

7. The sewage removal device of claim 1 wherein a discharge hose is connected to said fluid outlet conduit.

8. In a recreational vehicle of the type having an internal plumbing system including at least one wastewater holding tank and a drain line for periodically draining the contents of the holding tank, the improvement comprising:

(a) a sewage removal device affixed to said drain line and including a housing having an interior cavity in fluid communication with said drain line;

(b) a fluid outlet conduit extending from the lower portion of said cavity to the exterior of said housing; and (c) a fluid inlet conduit extending from the exterior of said housing and into an interior portion of said housing, said inlet conduit including a nozzle extending from a discharge end thereof and into said cavity in coaxial alignment with said outlet conduit, said nozzle being adapted to discharge a liquid jet stream into the interior of said fluid outlet conduit, whereby fluid discharged from said nozzle and into said outlet conduit creates a pumping action for in removing sewage from said cavity and into said outlet conduit which expedites waste removal therefrom.

* * * * *